United States Patent [19]
Rasmussen

[11] 3,767,047
[45] Oct. 23, 1973

[54] APPARATUS FOR SCREENING SEED AND THE LIKE MATERIALS

[75] Inventor: Svend Jorgen Rasmussen, Millinge, Denmark

[73] Assignee: Damas Jens Nielsens Maskinfabrik A/S, Vester Aaby, Denmark

[22] Filed: Oct. 12, 1971

[21] Appl. No.: 188,180

[30] Foreign Application Priority Data
Oct. 12, 1970 Denmark .................................. 5158

[52] U.S. Cl. .................... 209/240, 209/22, 209/295, 209/303
[51] Int. Cl. ............................................ B07b 1/26
[58] Field of Search .................... 209/303, 291, 295, 209/240, 21, 22, 290; 233/2, 7; 210/203, 325, 304

[56] References Cited
UNITED STATES PATENTS

| | | | |
|---|---|---|---|
| 413,161 | 10/1889 | Beeman | 209/295 X |
| 978,178 | 11/1910 | Thomas | 210/325 |
| 1,344,921 | 6/1920 | Meyer | 209/28 X |
| 2,384,181 | 9/1945 | La Fave | 209/28 X |
| 2,804,976 | 9/1957 | Russell | 210/325 X |
| 2,880,734 | 4/1959 | Edstrom | 209/303 X |
| 3,062,375 | 11/1902 | Palm | 209/303 |
| 3,092,582 | 6/1903 | Lacken | 233/7 X |

FOREIGN PATENTS OR APPLICATIONS
228,899 1/1920 Great Britain ........................ 209/22

*Primary Examiner*—Robert Halper
*Attorney*—Watson, Cole, Grindle & Watson

[57] ABSTRACT

Seed screening apparatus having two vertically arranged screening drums suspended from vertical shafts which are supported by means of a main shaft, said main shaft being provided with driving means for rotating the main shaft and accordingly apply a planetary motion to the drum shafts during which planetary movement the drums rotate about their shafts, means being provided for creating a pressure outside the drums which is lower than the pressure prevailing inside the drums.

1 Claim, 2 Drawing Figures

APPARATUS FOR SCREENING SEED AND THE LIKE MATERIALS

BACKGROUND OF THE INVENTION

The present invention relates to an apparatus for screening seed and the like materials. By experiments with screening apparatuses comprising at least one screening drum which is rotatable about its own axis and which simultaneously rotates about a main axis and wherein at least two outlets are provided, viz. one for the fine material expelled from the screening drum or drums and one for the cleaned seed, it has been discovered that the degree to which the seed will be cleaned is not as high as theoretically expected. Such experiments have proved that the seed after the screening operation still contains a great proportion of sand and other fine impurities. On the other hand, said experiments have proved that the particle sizes which are only a little smaller than the screen openings really are removed from the screening material. In order to solve the problem with the impurities in the cleaned seed a theory has been set up, viz. that the impurities remain in the cleaned seed due to a suction action created in the outlet for the cleaned seed due to the high screening rate of screening apparatuses constructed as mentioned above. This theory has been supported by the fact that the high screening rate necessitates a high outlet rate of the cleaned seed, and accordingly the cleaned seed will carry a lot of air out through the outlet for the cleaned seed. If such removal of air from the screening drum or drums increases the amount of air admitted to the drum or drums together with the screening material a vacuum will be created in the drum or drums and such vacuum will tend to prevent the expelling of the impurities from the drum or drums.

SUMMERY OF THE INVENTION

According to the present invention means are provided for creating a flow of air out through the screening drum or drums. Experiments have shown that such a flow of air solves the problem referred to above and removes the impurities from the cleaned seed due to the fact that said flow of air will carry away the fine material which otherwise would pollute the cleaned seed.

Such a flow of air passing from the interior of the drum or drums through the screening openings thereof and outwardly may be created in several different ways. E.g., an exhauster may be connected to the outlet for the fine material. Another possibility consists in a free communication between the interior of the drum or drums and the atmosphere surrounding the apparatus because such precaution prevents a vacuum from building up in the interior of the drum or drums. In order to secure such a result the inlet to the apparatus for the screening material may according to the present invention be provided with an air by-pass duct which is kept free of screening material during the inflow thereof in such a way as to secure sufficient air admittance to the interior of the drum or drums.

In case the apparatus is provided with a collecting channel arranged coaxially with the main axis for collecting the fine material expelled from the screening drum or drums and wherein vanes engage in order to move the fine material to the outlet therefor and with a collecting channel also arranged coaxially with the main axis for collecting the cleaned seed, and wherein vanes also engage in order to move the cleaned seed to the outlet therefor, the vanes for moving the fine material may according to the present invention be shaped in such a way as to create a flow of air out through the outlet for the fine material which flow of air is greater than the flow of air out through the outlet for the cleaned seed. In this embodiment the effect aimed at is achieved solely by parts of the apparatus which are necessary for the working of the apparatus, viz., solely by forming the vanes for the fine material as fan wings. Experiments have shown that such shaping of the vanes results in the air flow conditions requested and explained above. This result is due to the fact that the vanes for screening apparatuses constructed as stated above move along a circle having a great diameter, and accordingly they are able to apply a considerable centrifugal action to the air. On the other hand, it is of course neessary to avoid that the vanes which move the cleaned seed create the same air flow rate. However, this is easily achieved by a man skilled in the art on the basis of the theory relating to centrifugal fans.

Figure 1:
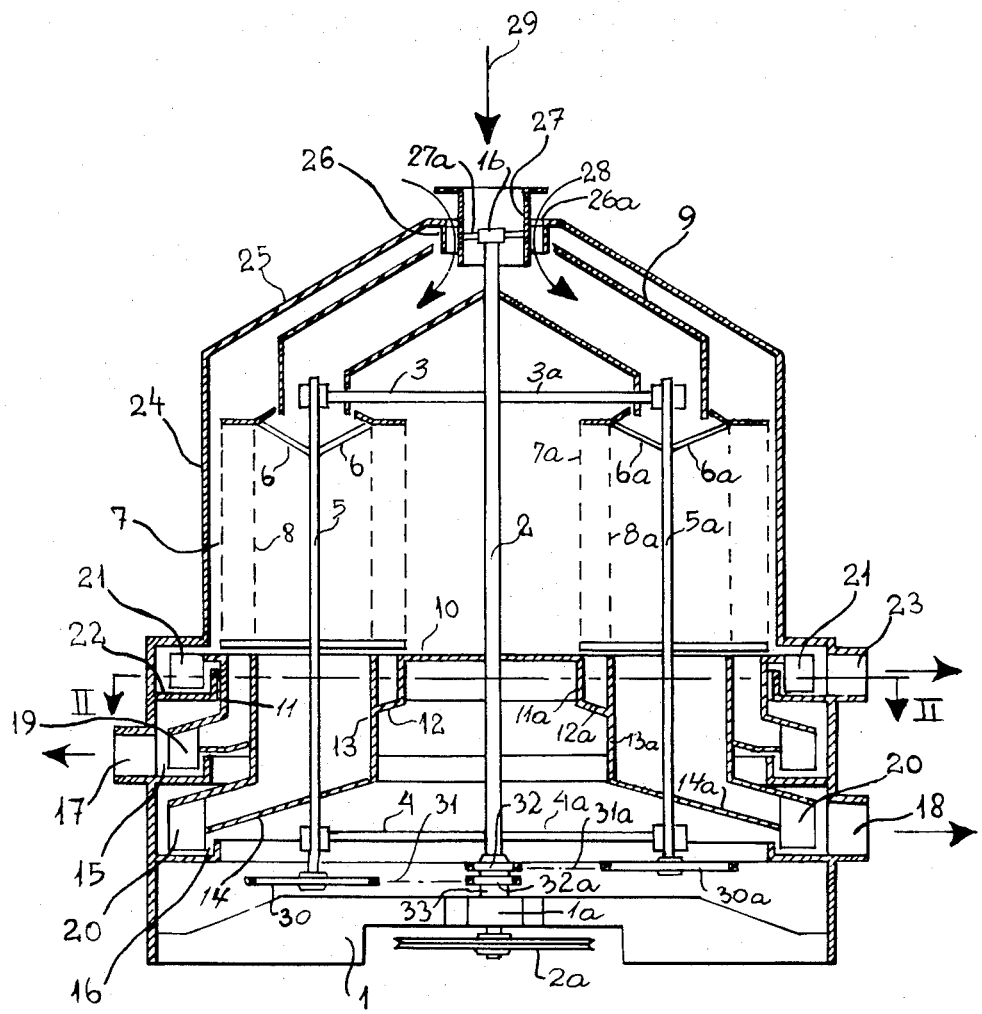
FIG. 1 is a vertical section through a preferred embodiment for the screening apparatus according to the invention.

DESCRIPTION OF A PREFERRED EMBODIMENT.

The screening apparatus shown comprises a base 1 wherein a vertical shaft 2 is rotatably supported by means of a bearing 1a. Two pair of cross arms 3,3a and 4,4a, respectively are secured to the shaft 2. At the end of the cross arms two vertical shafts 5 and 5a are rotatably supported. A screening drum is suspended from each of the shafts 5,5a by means of arms 6 and 6a, respectively. Each screening drum consists of a cylindrical outer screen plate 7 and 7a, respectively, and a cylindrical inner screen plate 8 and 8a, respectively. At the lower end of the shaft 2 a V-pulley 2a is secured which by means of a driving belt (not shown) is connected to a motor (not shown) so as to rotate the main shaft 2. By such rotation also the shafts 5 and 5a will be rotated via the arms 3,3a and 4,4a in such a way that the shafts 5 and 5a move in a planetary movement about the shaft 2. To the lower end of each of the shafts 5 and 5a a sprocket 30,30a, respectively is secured. Each of the sprockets 30,30a is connected with a stationary sprocket 32,32a, respectively by means of a drive chain 31 and 31a, respectively. The stationary sprockets 32 and 32a are supported by means of a stationary sleeve 33 through which the shaft 2 extends and which is supported by the bearing 1a in such a way that the shafts 5 and 5a rotate about their own axes simultaneously with the planetary movement about the main shaft 2. Moreover, the shaft 2 supports a hopper 9 having two outlets, viz. one for each of the screening drums. The hopper 9 participates in the planetary movement referred to above in such a way that screening material continuously are fed to the screening drums.

Moreover, the shaft 2 carries a plate 10 wherein an outlet arrangement is suspended below each screening drum. Each outlet arrangement consists of an outer cylinder 11 and 11a, respectively, the diameter of which corresponds to the diameter of the outer screen plate 7 and 7a, respectively and of a sloping bottom 14 and 14a, respectively. The sloping bottoms 12,12a and 14,14a project over collecting channels 15 and 16, respectively. Each of the channels has a tangential outlet 17 and 18, respectively and vanes 19 and 20, respectively project into the collecting channels in order to transport the materials out through the outlets. To the periphery of the plate 10 vanes 21 are secured which project into a collecting channel 22 to which a tangential outlet 23 is connected. The collecting channels 15,16 and 22 are arranged along the inner surface of a housing 24 which encloses the apparatus and extends coaxially with the centre shaft 2. The housing 24 comprises a sloping roof 25 which ends in a downwardly extending collar 26 which surrounds a feeding opening. The collar 26 projects into an upwardly facing opening in the h0pper 9. In the opening defined by the collar 26 an inlet tube 27 for screening material is secured by means of struts 26a. The tube 27 has a diameter less than the diameter of the collar 26 so that a space is provided for inflowing air as indicated by the arrow 28. By means of struts 27a an upper bearing 1b for the shaft 2 is secured to the tube 27. This construction assures that, simultaneously with feeding screening material to the apparatus as indicated by means of the arrow 29, an ample flow of air will be admitted to the interior of the screening drums through the hopper 9.

The screening apparatus illustrated operates as follows:

The material supplied to the hopper 9 is introduced into the spacings formed by the inner screen plates 8 and 8a. A combined centrifugal force will be applied to such material partly due to the rotation of the screening drums about the shafts 5 and 5a and partly due to the planetary movement of the shaft 5 and 5a and accordingly also the drums about the shaft 2. This combined centrifugal force results in a screening of the material through the inner screen plates 8 and 8a. The material which is unable to pass through the inner screen plates will due to the gravity force be moved down through the cylinders 13 and 13a, over the sloping bottoms 14,14a thereof and out into the collecting channel from which the material will be conducted out through the outlet 18 by means of the vanes 20. The material which passes the screen plates 8 and 8a will be screened once more by means of the outer screen plates 7 and 7a, and the material which does not pass out through the outer screen plates, the cleaned seed, will pass through the cylinders 11 and 11a, over the sloping bottoms 12 and 12a thereof and down into the collecting channel 15 from which the material is removed by means of the vanes 19 out through the outlet 17. The fine material will pass out through the outer screen plates 7 and 7a and be collected in the channel 22 from which the material is removed by means of the vanes 21 through the outlet 23.

Figure 2:
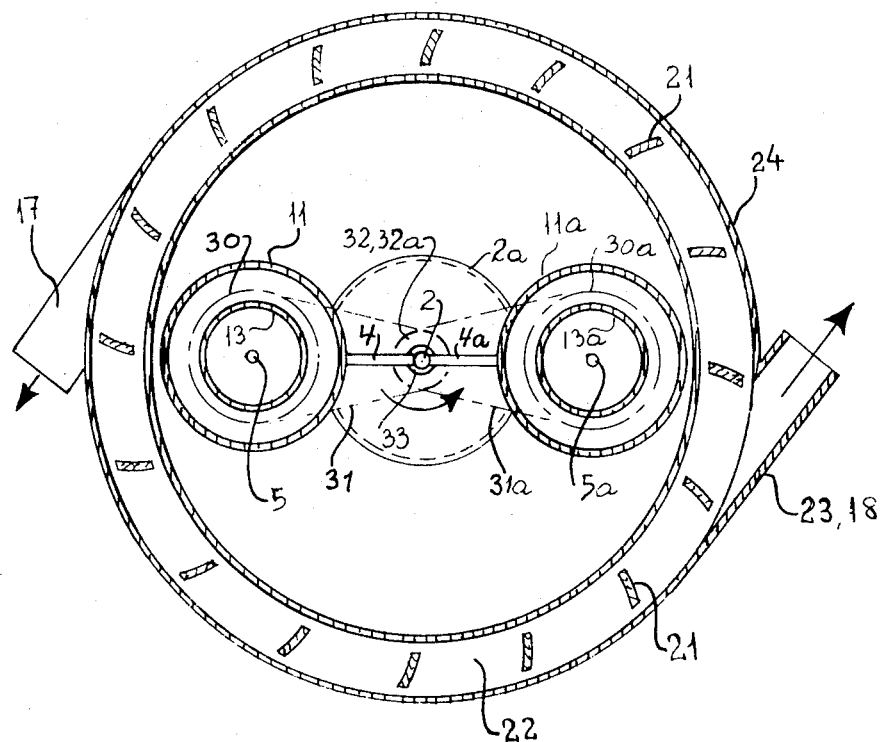
FIG. 2 is a horizontal section along the line II–II in FIG. 1.

The screening apparatus shown and explained above has a very high screening rate and accordingly it is necessary to secure a high outlet rate of the cleaned seed. No matter how the removal arrangement for the cleaned seed is arranged the flow rate of cleaned seed will be rather high and accordingly a great amount of air will be carried away together with the cleaned seed removed. Accordingly, a risk exists that a partial vacuum will be created in the interior of the screening drums. If such vacuum really is created, it will be difficult for the fine material to be expelled out through the screening drums. Accordingly, precautions have been taken in order to secure a flow of air from the interior of the screening drums and outwardly therefrom through the screening openings. In the embodiment shown, an ample air admission to the interior of the apparatus is secured by means of the positioning of the air inlet tube 27 as explained above. Moreover, precautions have been taken in order to create a suction effect in the collecting channel 22 through which the fine material is removed and which accordingly communicates with the outer surfaces of the screening drums. The latter precautions consist in that the vanes 21 are arranged closely adjacent each other and have a curved shape in the same way as fan wings for a centrifugal fan, cf. FIG. 2. This is a very simple embodiment due to the fact that the vanes 21 must be provided in order to remove the fine material in the embodiment shown on the drawing. Due to the fact that they are arranged along the periphery of the plate 10 they will move along a circular path having a great diameter, and accordingly they will offer a considerable action upon the air in the collecting channel 22. In order to further support the suction effect achieved thereby the collecting channel 22 may be shaped as a spiral housing having increasing width in the circumferential direction towards the outlet 23. A further possibility for achieving the flow of air referred to above in connection with this and other embodiments of the present invention consists in connecting an exhauster (not shown) to the outlet 23 for the fine material.

Moreover, by the embodiment shown on the drawing precautions have been taken in order to avoid a too heavy suction action in the collecting channel 15 for the cleaned seed and in the collecting channel for the coarser material. These precautions consist in that the amount and shape of the vanes 19 and 20 working in the channels 15 and 16 have been selected in such a way that the removal of the materials is carried out without dragging too much air out through the outlets 17 and 18 together with the materials. Accordingly, it is secured that a pressure prevails along the outer surface of the screening drums inside the housing 24 above the plate 10 which is less than the pressures prevailing inside the screening drums and accordingly a flow of air as explained above is secured for carrying the fine material out through the outer screen plates 7 and 7a.

I claim:

1. Apparatus for screening seed particles and the like, comprising a stationary outer housing, a vertical central shaft rotatably supported in said housing, at least two vertical planetary shafts supported by said central shaft, screening drums rotatably supported within said housing on each of said planetary shafts coaxially with said respective planetary shafts, each of said drums comprising at least an innermost and an outermost coaxially arranged screen, driving means rotating said drums about said central shaft and simultaneously rotating said screening drums on said planetary shafts, a hopper provided with a number of outlets corresponding to the number of screening drums, each said outlet communicating with the interior of the innermost screen of each drum through the open ends thereof, an inlet tube for material to be screened being positioned at the top of said housing and communicating with the interior of said hopper, an air by-pass opening which opens into the outer atmosphere and into the interior of said hopper surrounding said inlet tube, a first collecting channel supported by said housing below said drums and communicating via duct means mounted on said central shaft with the interior of the innermost screens of said drums, vane means projecting into said first collecting channel being secured to said duct means communicating with said first collecting channel, a second collecting channel supported by said housing below said drums and communicating via other duct means mounted on said central shaft with the spacings between the screens of said drums, other vane means projecting into said second collecting channel being secured to said duct means mounted on said central shaft communicating with said second collecting channel, a third collecting channel supported by said housing and communicating with the exterior of said drums, still other vane means projecting into said third collecting channel being distributed along the full circumference of a plate secured to said central shaft and supporting said duct means said other vane means being curved and closely adjacent each other.

* * * * *